United States Patent [19]

Kimberlin et al.

[11] 4,006,328
[45] Feb. 1, 1977

[54] STEERING COLUMN MOUNTED MULTIPLE SWITCH ASSEMBLY

[75] Inventors: Dan R. Kimberlin, Frankenmuth; Thomas J. Milton, Bay City, both of Mich.

[73] Assignee: General Motors Corporation, Detroit, Mich.

[22] Filed: Apr. 21, 1975

[21] Appl. No.: 569,604

[52] U.S. Cl. .................... 200/61.54; 200/61.27
[51] Int. Cl.² ................ H01H 9/00; H01H 3/16
[58] Field of Search ............ 200/61.27–61.38, 200/61.54–61.57

[56] References Cited

UNITED STATES PATENTS

| | | | |
|---|---|---|---|
| 3,374,321 | 3/1968 | Trarbach | 200/61.54 X |
| 3,511,943 | 5/1970 | Kibler | 200/61.27 |
| 3,725,622 | 4/1973 | O'Keefe | 200/61.27 |

*Primary Examiner*—James R. Scott
*Attorney, Agent, or Firm*—Warren D. Hill

[57] ABSTRACT

A multiple switch assembly mounted on a steering column has an actuator for operating a direction signal switch, a headlamp dimmer switch and washer/wiper switches, each operated by a selective movement of a common actuator lever.

1 Claim, 6 Drawing Figures

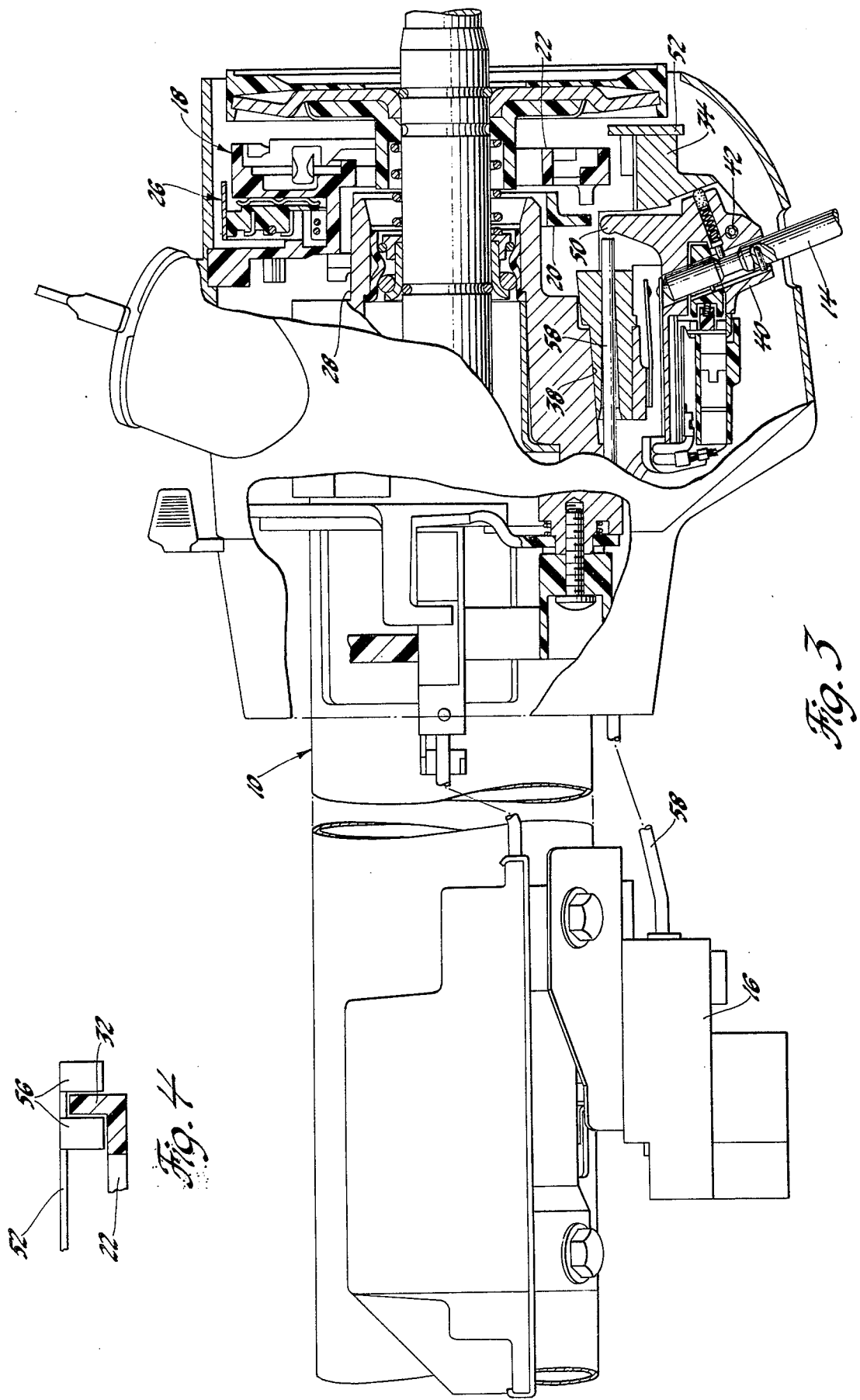

STEERING COLUMN MOUNTED MULTIPLE SWITCH ASSEMBLY

This invention relates to a multiple switch assembly having a common actuator and more particularly to such an assembly incorporating a vehicle direction signal switch and switches for controlling other vehicle functions.

It has previously been proposed to utilize the direction signal lever on a vehicle to operate other signals such as a headlamp dimmer switch and washer/wiper switches. By suitable design of a switch actuating mechanism, separate switching functions can be selectively carried out by rocking the direction signal about various pivot axes, rotating it about its own axis or reciprocating the lever in the direction of its axis. Heretofore, such proposals have required specialized direction signal switch assemblies since the conventional direction signal switch assembly lever rigidly connected thereto does not allow the several degrees of freedom of the lever which is required for the operation of other switches. Thus expensive redesign and retooling of the direction signal switch assembly would be required to convert to a multiple switch assembly having a common actuator. According to this invention, however, a conventional direction signal switch assembly with the lever omitted is used as a part of a multiple switch assembly and thereby eliminates any expense of changing the direction signal switch assembly design.

It is therefore a general object of this invention to provide a multiple switch assembly having a common actuator incorporating a conventional direction signal switch assembly.

It is a further object to provide such a multiple switch assembly wherein the common actuator is movable selectively in different modes for selective operation of the several switches in the assembly.

The invention is carried out by providing a conventional direction signal switch assembly mounted on a steering column, the assembly having an operating portion mounted for pivotable movement mounted about a first axis, a manually operable actuator mounted for pivotable movement about a second axis spaced from the first, and a linking element secured to the actuator and engaging the operating portion for moving the operating portion about the first axis when the actuator is moved about the second axis, the actuator having a lever movable about a third axis for operating a second switch.

The above and other advantages will be made more apparent from the following specification taken in conjunction with the accompanying drawings wherein like reference numerals refer to like parts and wherein;

FIG. 3 is a view of a steering column partially shown in cross section along the lines 3—3 of FIG. 2 revealing the switch assembly according to the invention;

FIG. 4 is a cross-sectional view of a detail taken along line 4—4 of FIG. 2;

Figure 1:
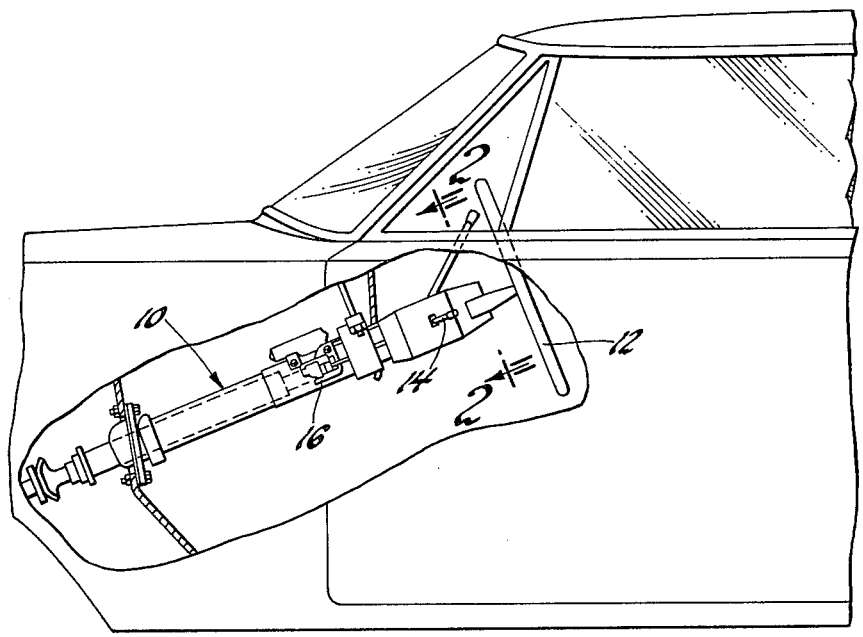
FIG. 1 is a partially broken-away view of a vehicle revealing a steering column carrying a switch assembly according to the invention.
Figure 2:
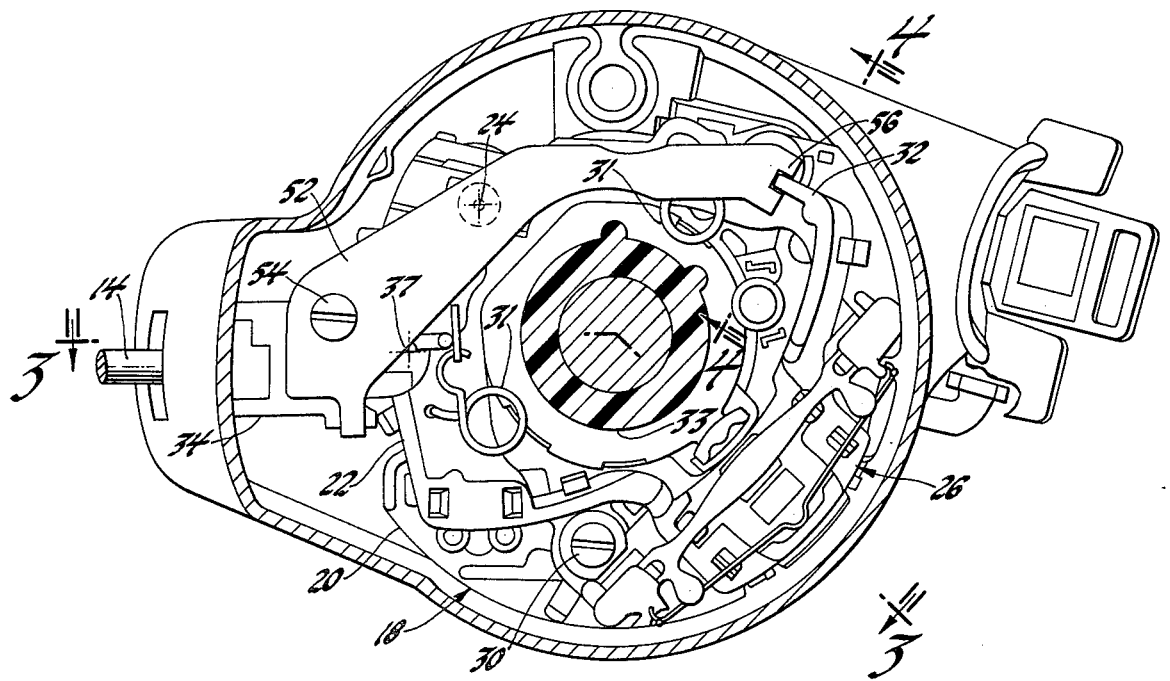
FIG. 2 is a cross-sectional plan view of the direction signal switch assembly taken along line 2—2 of FIG. 1.

FIG. 1 depicts a vehicle mounted steering column 10 having a steering wheel 12, a switch actuator lever 14 extending laterally from the steering column below the steering wheel 12, and a headlamp dimmer switch 16 supported on the side of the steering column below the lever 14. As shown in FIGS. 2 and 3, a direction signal switch assembly 18 includes a stationary portion 20 and a movable operating portion 22 pivoted to the stationary portion 20 at axis 24 to allow limited rocking movement about that axis for actuation of a direction signal switch 26. The stationary portion 20 is secured to a steering column support 28 by fasteners 30. The operating portion 22 has an upstanding rib 32 for structural rigidity. Cancelling pawls 31 mounted on the operating portion 22 cooperate with a cancelling cam 33 in a well known fashion to automatically return the operating portion 22 to neutral position after a turn is completed. These and other details of the direction signal switch assembly are standard and well known features of conventional direction signal mechanisms as shown for example in U.S. Pat. No. 3,510,839 to Elliott et al. and need not be further described here.

In conventional usage, an actuator lever is secured to the operating portion at the pivot axis 24. According to the present invention, this lever is omitted and another arrangement for driving the operating portion is used instead. Otherwise, the directional signal switch assembly is identical to that used in many standard vehicles and is, therefore, a readily available off-the-shelf item.

Figure 5:
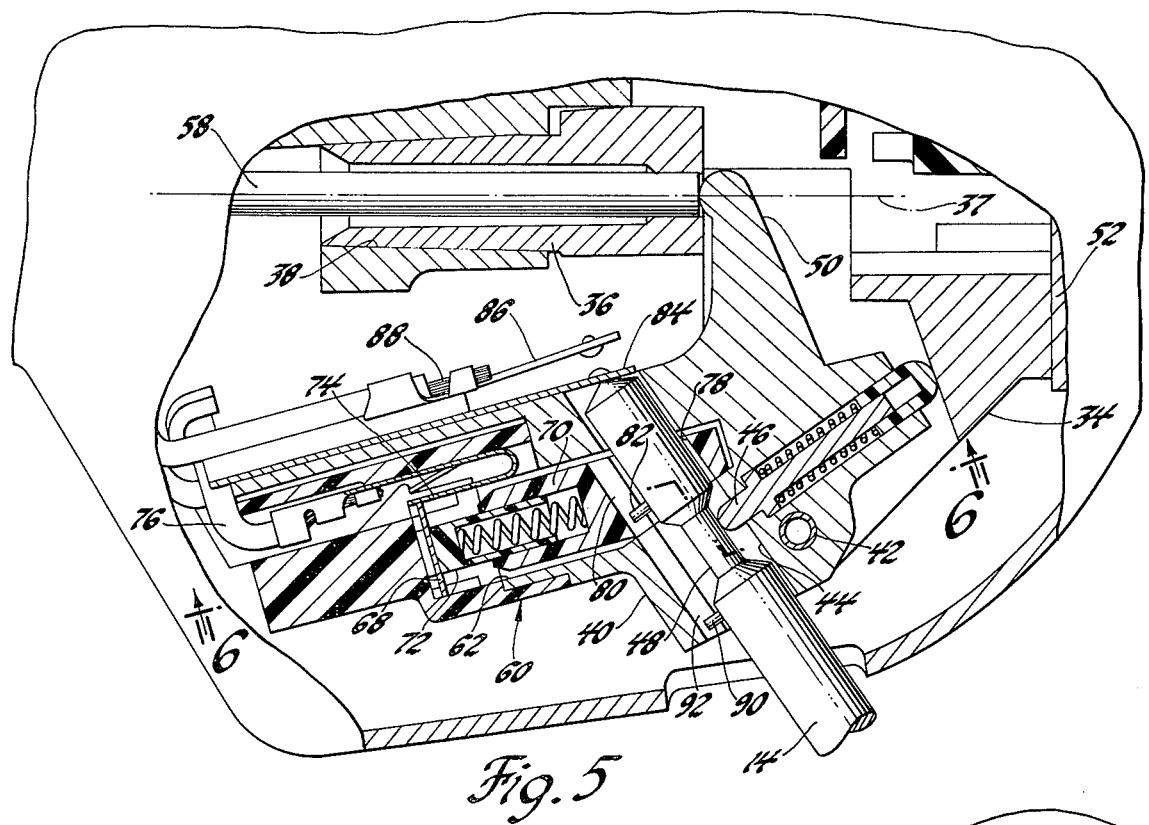
FIG. 5 is an enlarged cross-sectional view of the actuator portion of the switch assembly of FIG. 3.
Figure 6:
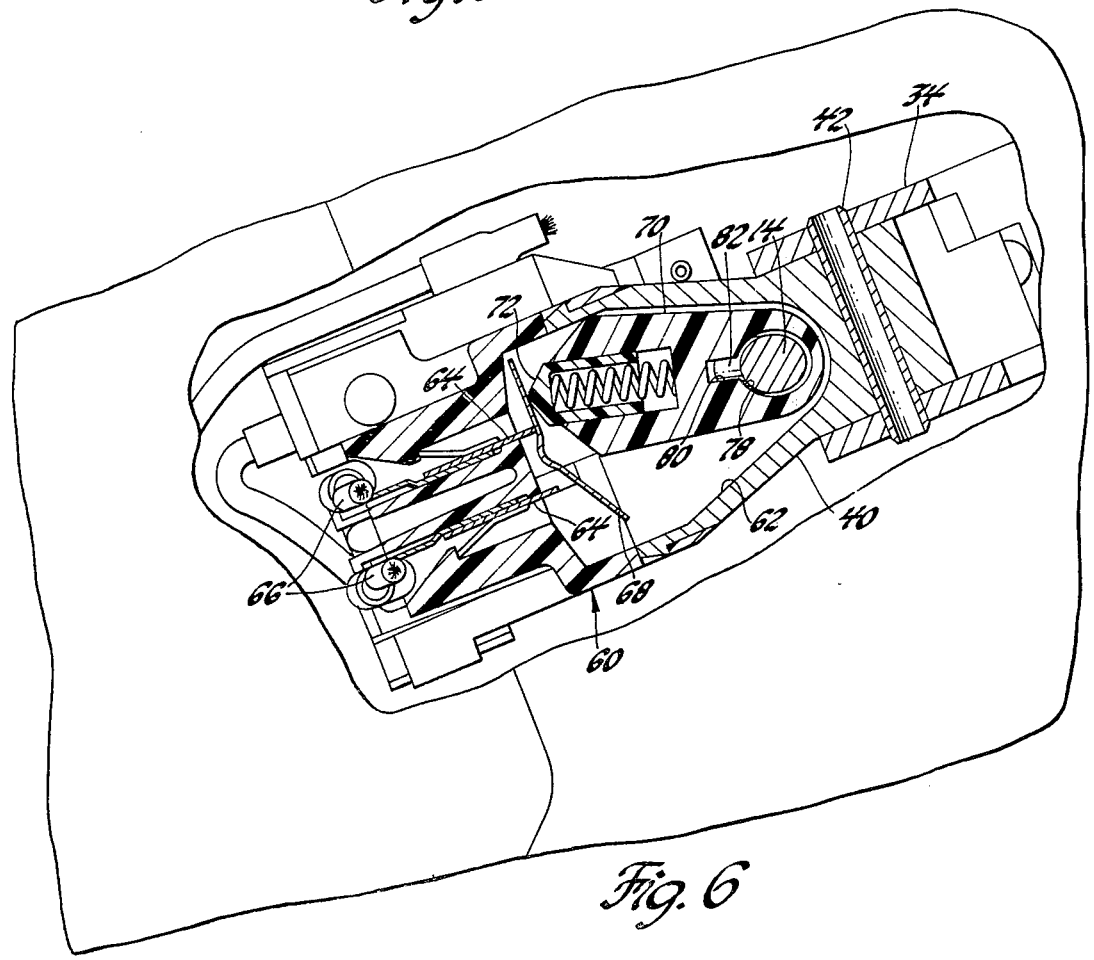
FIG. 6 is a cross-sectional view of an actuator taken along line 6—6 of FIG. 5.

As seen in FIGS. 3, 5 and 6, an actuator mechanism includes three major components comprising a first body portion 34 including a tubular bearing portion 36 which fits within a bore 38 for pivotal movement about a second axis 37 defined by the center line of the bore 38. A second body portion 40 is pivoted to the first body portion 34 by a pin 42. The third major component is the actuator lever 14 which slidably fits within a bore 44 of the portion 40. The lever 14 is removeably retained within the bore 44 by a spring biased pin 4 in the second body portion which engages a necked down portion 48 of the lever 14. The opposite end of the spring biased pin 46 engages a surface of the first body portion 34. The portion 40 includes a finger 50 which extends inwardly to a point aligned with the second axis 37 defined by the bore 38. A transmission link 52, as best shown in FIG. 2, is secured at one end of the first body portion 34 for movement therewith by a fastener 54 and includes a bent over tang 56 engaging the side of the first body portion 34 to assure a rigid connection to the portion 34. The transmission link 52 extends above the operating portion 22 to a point well spaced from the axis 24 and terminates in a pair of turned down tangs 56 (FIG. 4) which straddle the upstanding rib 32 on the operating portion 22. Thus when the actuator lever 14 is moved in the customary manner for operating direction signals, the first body portion 34 rocks about the second axis 37 causing the transmission link 52 to similarly move to rock the operating member 22 about the first axis 24 to either right or left direction signal position.

The headlamp dimmer switch 16 is actuated by a rod 58 which extends upwardly from the switch 16 along the steering column and through the tubular portion 36 to a point adjacent the finger 50. Thus, when the actuator lever 14 is moved toward the steering wheel 12, the second body portion 38 pivots about the pin 42 and the finger 50 moves against the upper end of the rod 58 to depress the rod thereby actuating the dimmer switch 16. The dimmer switch like those conventionally in use is spring biased to return its actuating member to normal position so that the rod 58 will move to its upper position shown in FIG. 3 from its depressed position shown in FIG. 5 whenever the actuating force is removed from the actuator lever 14.

Additional switches intended for use as windshield washer and wiper switches are carried by the second body portion 40. As best shown in FIGS. 5 and 6, a washer switch 60 is housed in a cavity 62 in the second body portion and comprises a toggle switch having a pair of electrical contact blades 64 secured to electrical conductors 66 and a movable V-shaped contact 68 which rests on either or both of the blades 64 and is held in position by a rocking element 70 which includes a spring biased plunger 72 which presses against the contact 68. The contact 68 is in sliding engagement with a stationary spring contact 74 which in turn is connected to a conductor 76. One end of the rocking element defines a bore 78 which receives the actuator lever 14 and one side of the bore contains a slot 80. A pin 82 extending laterally from the lever 14 rides in the slot 80 so that when the actuator lever 14 is rotated about its own axis, the rocking element 70 moves therewith. The element 70 has three stable or detent positions including the upper position shown in FIG. 6, an intermediate position in which the plunger 72 rests in the center of the V-shaped contact 68 for bridging the two contact blades 64 and a lower position in which the contact 68 will engage only the lower blade 64. The three stable positions of the rocking element 70 correspond to off, low and high speed windshield wiper functions with the intermediate position corresponding to low wiper speed.

To provide a washer switch, the inner surface of the second body portion supports a resilient contact member 84 which normally abuts the end of the actuator lever 14 and a second contact member 86 which is normally spaced from the resilient contact 84 and is connected to a conductor 88. A pin 90 extending laterally from the lever 14 engages a cam slot 92 in the bore 44. The cam slot is formed at an angle across the surface of the bore 44, i.e., it is not parallel to the center line of the bore 44. When the actuator lever 14 is pushed inwardly in the direction of its own axis, the resilient contact 84 momentarily engages the stationary contact 86 to initiate operation of the windshield washer system. As the lever 14 is thus pushed inwardly, the pin 90 riding in the cam slot 92 causes rotation of the lever 14 to move the rocking element 70 of the windshield wiper switch to its slowest speed position thereby automatically starting the windshield wipers when the windshield washer operation is initiated.

It will thus be seen that the switch assembly includes a conventional off-the-shelf direction signal switch assembly and an actuating mechanism so designed that it is able to operate the direction signal switch by selective rocking movement by the actuator lever 14, and the actuator mechanism is also free to be moved in other modes to selectively actuate auxiliary switches, and this is accomplished without expensive redesign and retooling for the direction signal mechanism.

The embodiments of the invention in which an exclusive property or privilege is claimed are defined as follows:

1. A steering column mounted multiple switch assembly having a common actuator means comprising
a support on the steering column,
a direction signal switch means mounted on the support having an operating portion mounted for rocking movement substantialy about a first axis and including switch cancelling means on the operating portion, the operating portion comprising a molded generally annular element having an integral upstanding reinforcing rib,
a manually operable actuator means mounted on the support for rocking movement substantially about a second axis parallel to and laterally spaced from the first axis, the actuator means including a manually moveable actuator lever for controlling movement of the actuator means,
a transmission member comprising a rigid link having first and second ends, the link being fixedly secured at the first end to the actuator means for rocking movement therewith about the second axis so that the second end swings through an arc upon such rocking movement, the second end of the link extending to a region of the operating portion of the direction signal switch spaced from the first axis and terminating in a pair of spaced depending tangs loosely straddling the upstanding rib of the operating portion to effect rocking movement of the operating portion substantially about the first axis thereof upon rocking movement of the actuator means about the second axis,
auxiliary switch means carried by the steering column for actuation by movement of the actuator lever about a third axis,
and means mounting the actuator means for movement substantially about the third axis for operation of the auxiliary switch means
whereby selective movement of the actuator means about the second and third axes respectively, selectively actuates the respective switch means.

* * * * *